United States Patent [19]

Mason

[11] 4,279,684
[45] Jul. 21, 1981

[54] SYSTEM FOR APPLYING AND WRAPPING LINE GUIDES TO A FISHING ROD BLANK

[76] Inventor: Eugene B. Mason, 9675 E. Live Oak Rd., Stockton, Calif. 95215

[21] Appl. No.: 84,501

[22] Filed: Oct. 12, 1979

[51] Int. Cl.³ .............................................. B21F 17/00
[52] U.S. Cl. ................................... 156/425; 242/7.19
[58] Field of Search ............... 156/429, 446, 172, 425, 156/187, 430, 431, 432; 242/7.19, 7.01, 7.11, 140; 57/11

[56] References Cited

U.S. PATENT DOCUMENTS

| | | | |
|---|---|---|---|
| 2,082,562 | 6/1937 | McArthur | 242/7.19 |
| 2,556,827 | 6/1951 | Striano | 242/7.19 |
| 2,564,016 | 8/1951 | Maddic | 242/7.19 |
| 2,609,155 | 9/1952 | Fosnaugh | 242/7.19 |
| 2,640,653 | 6/1953 | Wodetzky | 242/7.19 |
| 2,967,390 | 1/1961 | McCormick | 57/11 |
| 3,197,148 | 7/1965 | Edick | 242/7.19 X |
| 3,250,493 | 5/1966 | Burkley et al. | 242/7.01 X |

*Primary Examiner*—David A. Simmons
*Attorney, Agent, or Firm*—Flehr, Hohbach, Test, Albritton & Herbert

[57] ABSTRACT

For applying and wrapping line guides to a fishing rod includes a stable bed characterized by three guide channels whereby means for bending the rod to permit marking guide positions and means for placement of and checking proper axial alignment of guides so placed can be carried out in one channel. A second channel includes means for firmly supporting the rod for rotation on its axis while a thread dispensing and tensioning assembly is movable along a third channel to supply thread to the rotating rod. Finally, the bed together with thread dispensing assembly and rotatable rod holders and the like can all be moved conjointly by moving the bed.

14 Claims, 18 Drawing Figures

SYSTEM FOR APPLYING AND WRAPPING LINE GUIDES TO A FISHING ROD BLANK

Over the years, fishermen have wrapped colorful threads about the longitudinally extending portions of line guides carried on fishing poles as well on and about the handle portion of the pole in order to make their own fishing pole distinctive, and attractive and customized. This technique has been developed to the point where consumers are purchasing the raw materials of a fishing rod, applying line guides to the rod and then wrapping the line guides and handle portions as desired using wrapping jigs of various designs. In so doing it is necessary to place the line guides at their appropriate locations taking into consideration the fact that when the fishing rod is held free of any support, as in the hand of the fisherman, the guides must all line up in a common plane. Thus, it has been observed that after line guides have been placed in line along a given fishing rod blank their positions can change when the fishing rod is lifted free of any support other than at the handle.

Accordingly, as shown herein a rod wrapping jig or assembly has been provided having a number of different advantages and features as described further below.

In general there has been provided a rod wrapping system employing an elongate bed member formed with an elongate guide means therein. Assemblies for supporting and holding a rod to be wrapped are movable variously along the guide means. Each of the assemblies include a plurality of three independently operative rollers arranged to include two bottom rollers disposed in predetermined spaced relation for receiving a fishing rod blank or the like mutually thereon and a top roller pivotable in an arc into and out of engagement with a rod carried by the bottom rollers to define the center of rotation between the three rollers when holding the rod among the three. Means supporting the center of rotation of each of the assemblies at progressively different heights from the bed member serve to align the center of rotation of the assemblies to lie substantially upon a common axis. The assemblies are movable along the guide means until the center of rotation of each assembly lies on the axis of the rod when parallel to the bed member.

In addition to the above the system employs a number of improved aspects including means for holding the rod blank from the handle while supporting the rod inclined at an angle to determine alignment of the line guides. According to another feature means are provided for supporting the rod in a manner to apply an appropriate arc thereto so as to permit line guides to be placed thereon. In addition, and at one end of the assembly, a support is movably mounted so as to receive an end portion of the rod blank to dispose the center of rotation of a rod support assembly in alignment with the axis of the center of rotation of other supporting and holding assemblies.

As disclosed herein a motor is carried by the aforementioned feature so as to be able to be coupled to rotate a rod blank.

According to yet another feature of the invention, is the provision for means essentially extending the length of a support table by permitting the entire assembly to be moved between advanced and retracted positions without releasing the rod from its aligned condition. According to another feature of the invention a thread tensioning and dispensing assembly has been provided which is characterized by thread guiding means for receiving and dispensing thread simultaneously from a plurality of spools while inhibiting the plurality of threads being dispensed from crossing each other, as has previously been a problem where single thread guides are used to guide plural threads simultaneously. The thread tensioning and dispensing assembly is further characterized as being disposed for movement along a guide channel while at the same time employing means for eliminating any lost motion when thread is be withdrawn from spools carried by the assembly.

In general, it is an object of the present invention to provide an improved rod wrapping jig for wrapping a fishing rod blank or the like with thread.

Another object of the invention is to provide a rod wrapping system having improved means for supporting a rod to be rotated about its own axis.

Yet another object of the invention is to provide means for supporting the axis of the rod to be wrapped including laterally movable supports standing at progressively different heights to accommodate for the taper in the rod.

Another object of the invention is to provide improved means for supporting a rod carrying a load so as to permit marking of line guide locations thereon.

Another object of the invention is to provide means for locking the rod blank against rotation during placement of the guides thereon and during elevation of the rod from the handle end.

Yet another object is to provide a vertically positionable rod support assembly at one end of the system.

The foregoing and other objects of the invention will become more readily evident from the following detailed description of a preferred embodiment of the overall system when considered in conjunction with the drawings.

FIG. 6 shows a side elevation section view taken along the line 6—6 in FIG. 3;

A rod wrapping system 10 as herein disclosed is arranged to be supported upon a work table 11 or the like and generally comprises an elongate flat bed member 12 formed of suitable material such as an anti-friction semi-rigid plastic. Member 12 is characterized by a plurality of three elongate parallel guide channels 13, 14, 16, formed therein. Cleats 17 fastened to the top surface of work table 11 engage the side edges of bed member 12 for purposes of permitting bed member 12 and the apparatus carried thereon to be moved along work table 11 to effectively extend the length of the overall apparatus as described further below.

The arrangement of the apparatus herein generally includes means for supporting a fishing rod blank or the like (hereinafter referred to as fishing rod) in a manner permitting the rod to be marked with line guide locations thereon as shown generally in FIGS. 1 and 3. After the line guide locations have been marked, the fishing rod is locked in a non-rotatable manner so that the guides can be adhered temporarily upon the rod. Thereafter, their alignment can be checked by raising the rod upwardly held only by the handle as shown generally in FIGS. 7-10.

After disposing the line guides on the fishing rod in an aligned relationship the rod blank is mounted for rotation about its axis and disposed parallel to bed member 12 by adjusting support assemblies 68 in a manner which compensates for the taper of the rod.

Finally multiple threads are dispensed respectively from a plurality of different spools of thread as the rod is rotated.

The foregoing represents a general organization of the system as herein described.

In order to determine the locations for applying line guides to a fishing rod blank a body 18 having a preselected weight disposed at rest on a supporting surface, such as the surface which supports the work table 11 may be used. An elongate flexible cable 19 serves to couple body 18 to the tip end of a fishing rod blank 21.

In order to support the fishing rod blank 21 in a bowed orientation to permit the marking of positions for line guides to be applied therealong, a handle holder assembly 22 is retained by channel 13 but is free to be movable therealong for receiving and holding the handle end of a fishing rod. Thus, channel 13 is dove shaped on the sides whereby both sides are inclined upwardly to overhang an elongate edge margin of the bottom of the channel. A correspondingly shaped channel-engaging base portion 23 serves to retain assembly 22 in channel 13 while permitting assembly 22 to move freely therealong.

Assembly 22 includes an upwardly extending panel 24 angled slightly from the vertically and reinforced by the web 26. A socket 27 formed in panel 24 serves to receive the end of a fishing rod blank 21.

Elevating means 28 also retained by channel 13 and movable therealong includes a traveling block 34 movable between lowered and raised positions for engaging and elevating an intermediate portion of rod blank 21 while the handle end remains engaged in socket 27.

Elevating means 28 is movable to any of a plurality of heights above bed member 12 so as to cause the tip of rod blank 21 to lift body 18 clear of the supporting surface therebeneath to bend the rod to form an arc prior to marking guide positions thereon.

Accordingly, as above referred to the elevating means 28 includes a base assembly 29 characterized by a broad panel 30 riding on the top surfaces of bed member 12 flanking channel 13 and a downwardly depending dove tailed locking piece 31 riding along channel 13 in engagement with the side walls thereof.

Elevating means 28 further includes an upwardly extending support member 32 formed to include an interior channel 33 for receiving the traveling block 34.

Support member 32 includes a bifurcated upper end characterized by a pair of spaced upwardly extending channel arms 32a spaced to receive a fishing rod blank 21 therebetween to engage and rest upon block 34. Block 34 is movable variously along channel 33 to the positions defined by holes 36 distributed along the length of channel arms 32a.

Locking pins 37 for engaging openings 38 extending through block 34 when aligned with a pair of openings in each of the two channeled legs 32a of support member 32 for selectively disposing block 34 at various heights along channel 33.

A web 39 forms a brace giving strength to the upwardly extending support member 32 from its base 29.

Finally, a substantially inextensible, flexible, tendon such as the chain 41 of predetermined length extends between elevating means 28 and the handle retaining assembly 22 to prevent the handle retaining assembly and the elevating means from moving apart beyond the length of chain 41 while a fishing rod blank 21 is disposed therebetween.

Figures 2, 3, 4, 5:
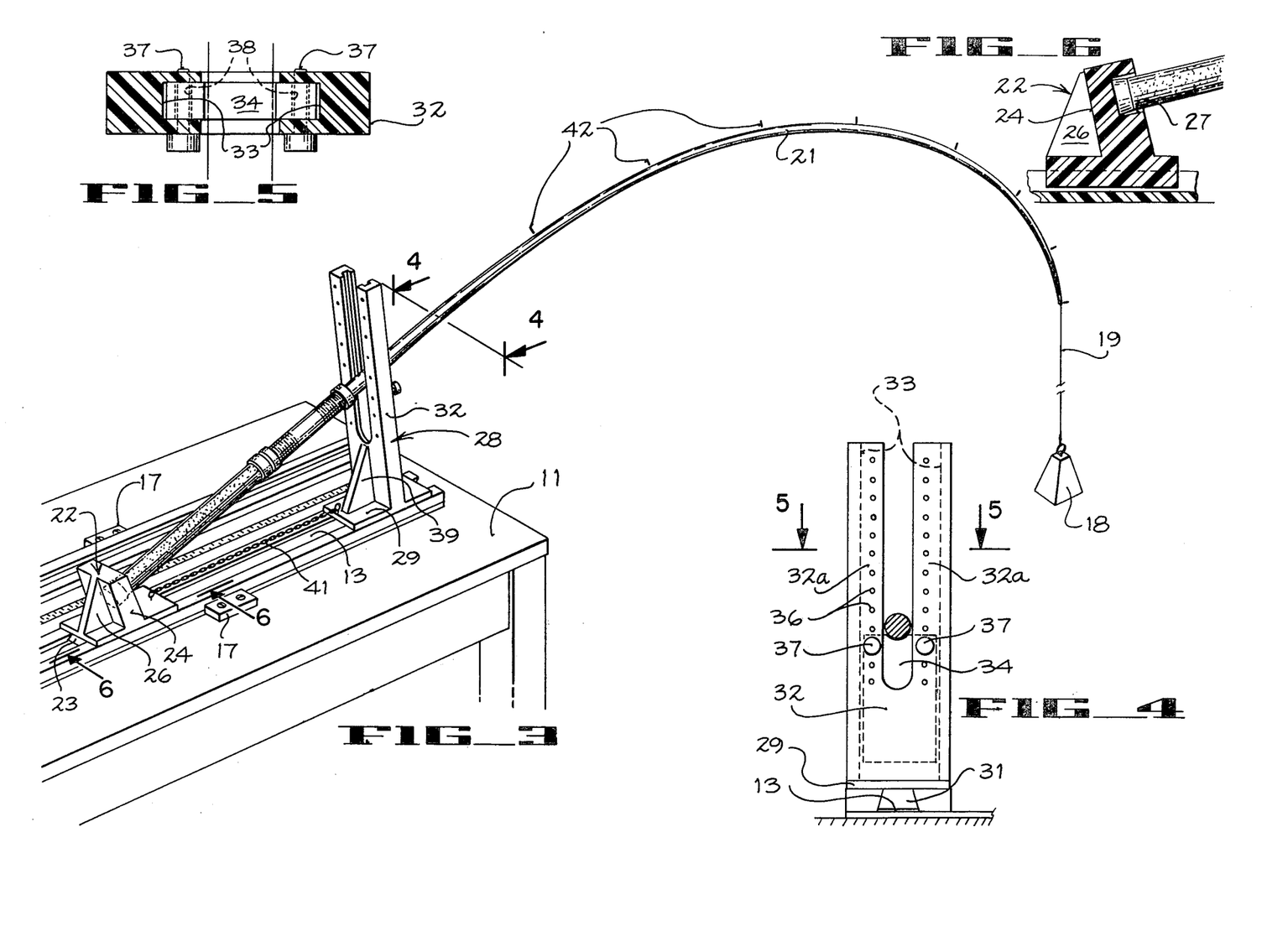
FIG. 3 shows an enlarged detail view in perspective showing means for supporting a fishing rod blank or the like during a stage wherein line guide positions are marked off along the fishing rod blank.
FIG. 4 shows a front elevation view taken along the line 4—4 in FIG. 3 of a fishing rod support assembly.
FIG. 5 shows a plan view in section taken along the line 5—5 of FIG. 4.
Figure 7:
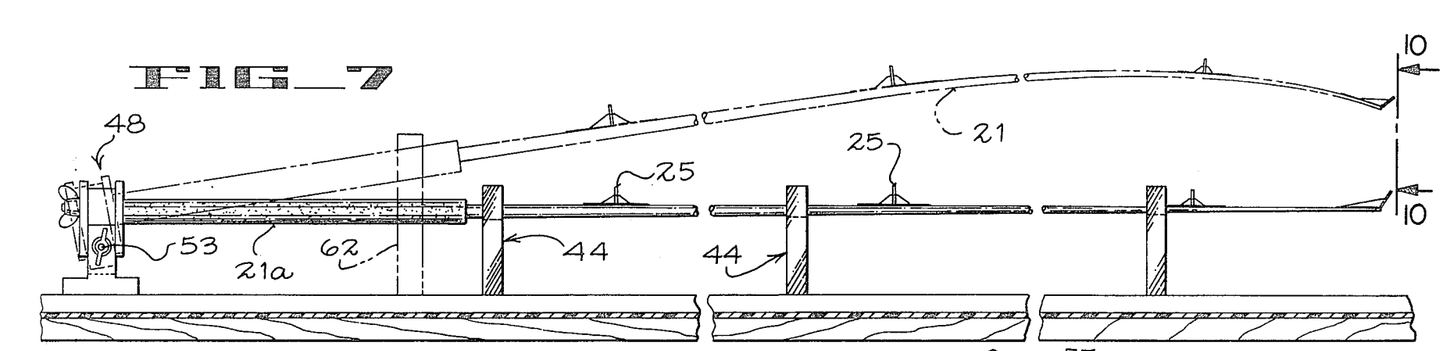
FIG. 7 shows a side elevation view partially in section for demonstrating the attachment and alignment of line guide devices along a fishing rod blank.

As shown in FIG. 3 scribe marks 42 have been indicated along the length of fishing rod blank 21 as indicating the positions where line guides 25 should be mounted. As is known, the location of such line guides should preferrably be such that the fishing line should always be supported substantially solely by the line guides and not engage the fishing rod as the line moves along the rod. Accordingly, a straight line between adjacent line guides 25 at positions 42 defines a tangent of the associated arcuate portion of the blank 21 therebetween whereby a fishing line can be supported by the adjacent guides 25 free of engagement with blank 21.

Having determined the location for each line guide, line guides are now applied along a fishing rod blank in axial aligned relation by disposing the rod blank to be supported by a plurality of rod supports 44 adapted to be moved variously along channel 14. Supports 44 are formed to include a base portion 46 to fit snugly within channel 13 and to extend sufficiently along channel 13 to provide lateral stability thereto. An upstanding support panel 47 includes, as viewed in side elevation, a V-shaped crotch 43 for receiving a rod blank 21 or the like resting therein. The apex of the V for the support panel of each of the plurality of rod supports lies on a common axis when supports 44 are disposed in channel 14. In addition to the rod supports 44 means are carried in channel 14 for engaging and locking an end of the rod to inhibit rotation thereof during application of line guides thereto.

Figures 8, 9:
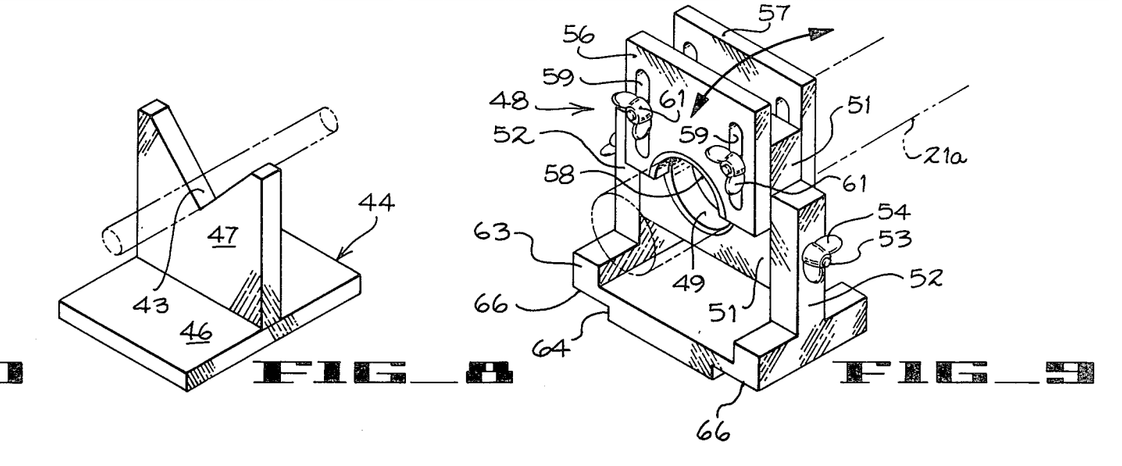
FIG. 8 shows an enlarged perspective view of a fishing rod blank support of the type employed in FIG. 7.
FIG. 9 shows a diagrammatic perspective view of a fixture for locking a fishing rod blank against rotation during guide placement and testing.

Thus, an engaging and locking assembly 48 as shown best in FIG. 9, includes means forming a cradle 49 for receiving the handle end 21a of a fishing pole resting thereon. Accordingly, the cradle 49 is formed as an arcuate surface cut out of a transversely disposed cradle body 51. Means mounting cradle body 51 between a pair of upright posts 52 comprises a pair of trunnions 53 extending laterally away from body 51 to pass through openings (not shown) in each of the posts 52 to be engaged by wing nuts 54.

Accordingly, there has been provided means for supporting the cradle 49 for tipping about a predetermined axis defined by trunnions 53 and extending transversely of the axis of the fishing rod blank 21.

Means forming a closure across cradle 49 and movable between raised and lowered positions includes the pair of independently movable locking plates 56, 57 each of which is formed with a downwardly directed arcuate closure surface 58. In addition, plates 56, 57 are formed with positioning slots 59 whereby fastening means such as the wing nuts 61 may readily releasably lock closure plates 56, 57 against the handle 21a of a fishing rod disposed on cradle 49 to permit the cradle to be tipped. Assembly 48 prevents the rod blank 21 from rotating while supported at an upward angle by means of a notched block 62 interposed between the rod and bed member 12.

Figures 1, 2:
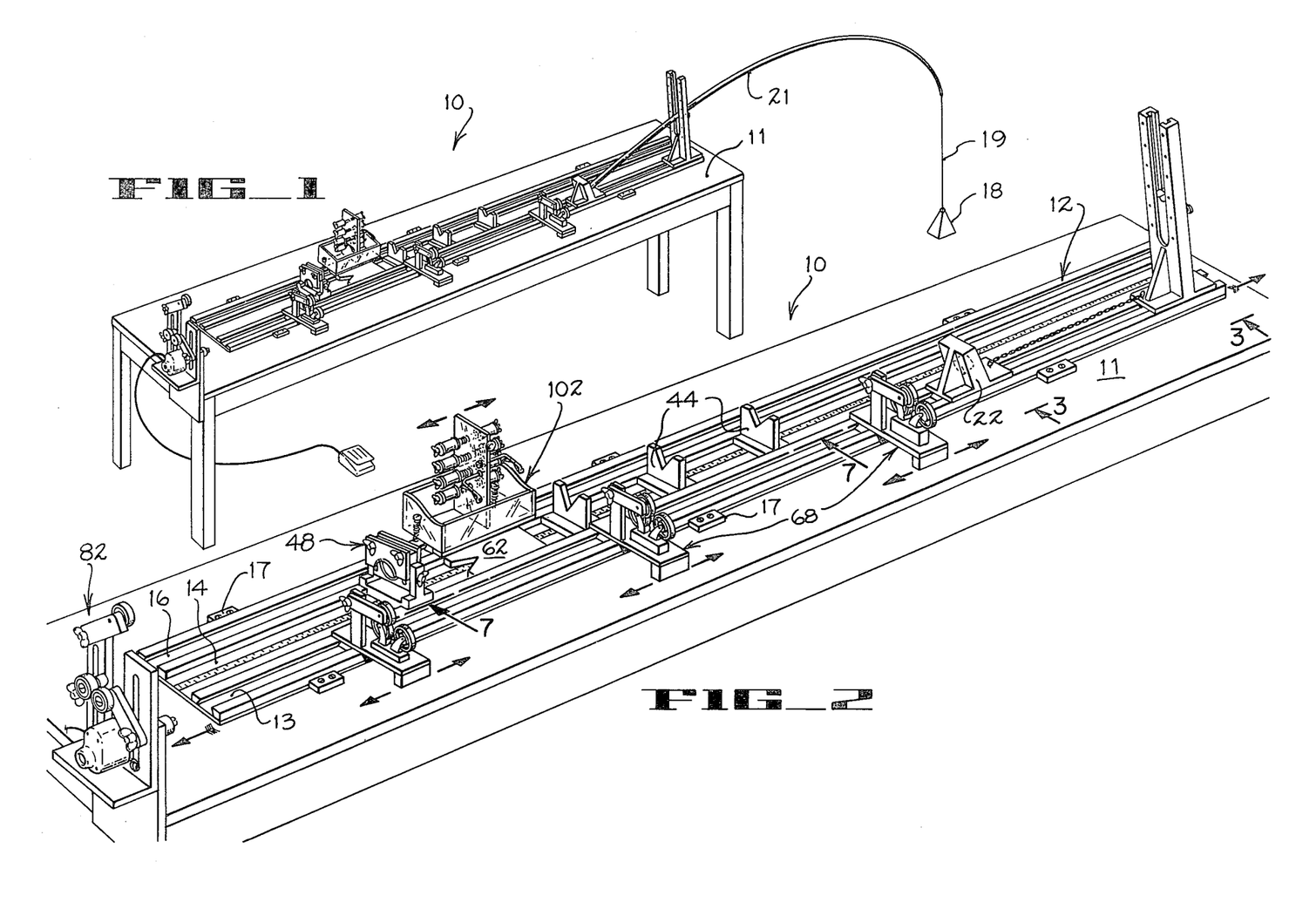
FIG. 1 shows a diagrammatic perspective view of the overall system arrangement at a stage prior to marking the line guide positions along the bowed arc of the fishing rod blank.
FIG. 2 shows an enlarged view of FIG. 1 according to the invention.

Block 62 has a width corresponding to the width of channel 14 whereby it can be laid flat into channel 14 when not in use, as shown in FIG. 2. However, as shown in phantom lines in FIG. 7, when the rod blank 21 is to be supported to determined alignment of the previously placed line guides the block 62 can be disposed in position to support the rod blank at an upwardly inclined angle.

In order to provide stability to assembly 48 the base 63 includes a downwardly depending, broadly extending guide portion 64 having a dimension substantially corresponding to the width of channel 14 whereby guide portion 64 can be inserted into channel 14 and the shoulders 66 formed beneath base 63 disposed to ride upon the surface adjacent channel 14.

After the handle portion 21a of rod blank 21 has been disposed within the opening defined by cradle 49 and closure members 56, 57, and the balance of the rod disposed in supports 44, locking assembly 48 is tightly attached by tightening the wing nuts 61 to preclude rotation of the rod blank 21. Then line guide elements 25 are attached temporarily to the location previously selected along the length of rod 21. After the foregoing procedure, the rod is propped at an upward angle by means of support block 62 whereby a person can inspect the alignment of line guides 25, as shown in FIG. 10, by viewing from one end of rod 21 to determine whether or not the guides have been rotated when the rod is lifted free of its supports 44.

Figure 10:
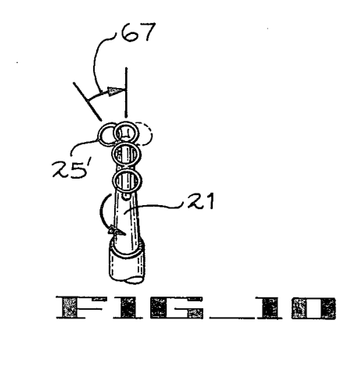
FIG. 10 shows a diagrammatic end view taken along the line 10—10 in FIG. 7 representative of a plurality of line guide devices, one of which is out of alignment and will need to be repositioned.

Thus, as shown in FIG. 10, upon lifting rod 21, it can be observed that guide 25' has twisted to the left whereby it is necessary to re-position it clockwise as shown by arrow 67.

Once the line guides have been tacked into precise alignment along the length of rod 21 in a free and unsupported condition, rod blank 21 must be mounted for rotation precisely about its axis so that thread can be wrapped therearound.

Figure 11:
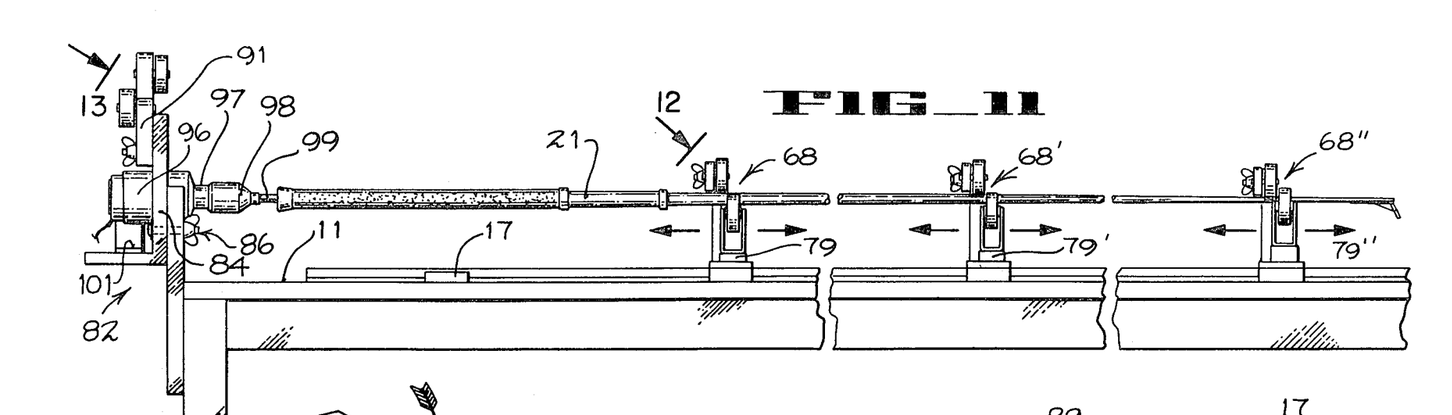
FIG. 11 shows a side elevation view according to FIG. 2 characterized by roller guide assemblies supporting a fishing rod blank upon an axis of rotation parallel to the bed of the assembly.
Figure 12:
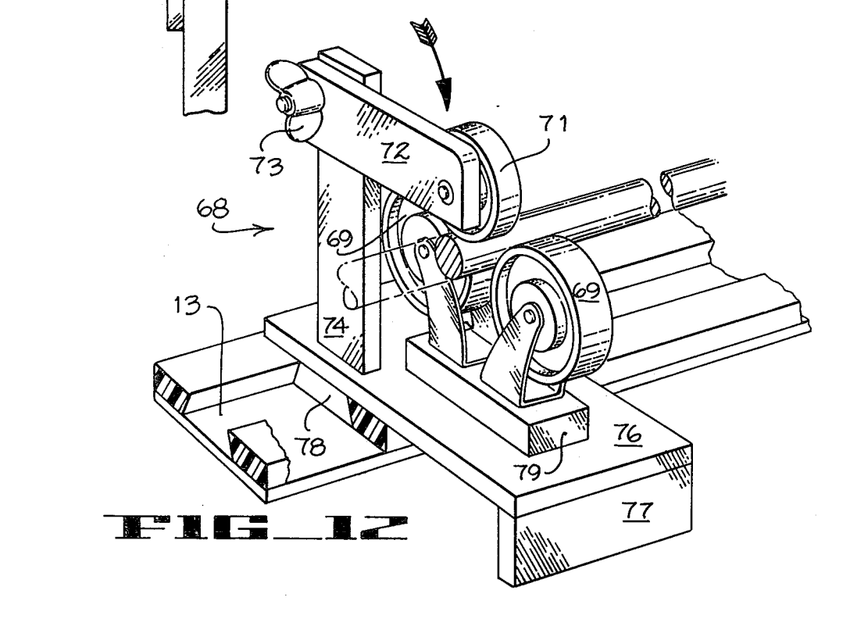
FIG. 12 shows a diagrammatic perspective view of a roller guide assembly employed in FIG. 11 as viewed from the direction indicated at numeral 12 therein.

Accordingly, as shown best in FIGS. 2, 11 and 12, rod rotating assemblies 68 for supporting and holding a rod to be wrapped are movable along channel 13 to be positioned variously along channel 13. Each assembly 68 includes a plurality of three independently operable rollers arranged to include two bottom rollers 69 disposed in predetermined spaced relation for receiving a fishing rod blank or the like mutually thereon and a top roller 71 pivotally supported as by means of a pivot arm 72 to be movable into and out of engagement with the rod carried by rollers 69 to define the center of rotation between the three rollers when holding the rod. Pivot arm 72 is coupled by means of a readily releasable wing nut 73 to a standard 74 whereby roller 71 can be firmly locked against a rod roller 69. Assembly 68 includes a base comprising a transversely extending platform 76 and a stabilizing element 77 depending downwardly from the distal end of platform 76 so as to ride along the surface of work table 11. Platform 76 is guided along channel 13 by means of a dove tailed locking piece 78 secured beneath platform 76.

As shown in FIG. 12 the bottom rollers are disposed in a predetermined spaced apart relation and are mounted upon a spacer block 79. As shown in FIG. 11 the spacer blocks 79' and 79" serve to support the center of rotation of each of assemblies 68 (while holding rod 21) at progressively different hieghts from bed member 12 so as to align the center of rotation of the assemblies 68 to lie substantially on a common axis as now to be described.

Figures 17, 18:
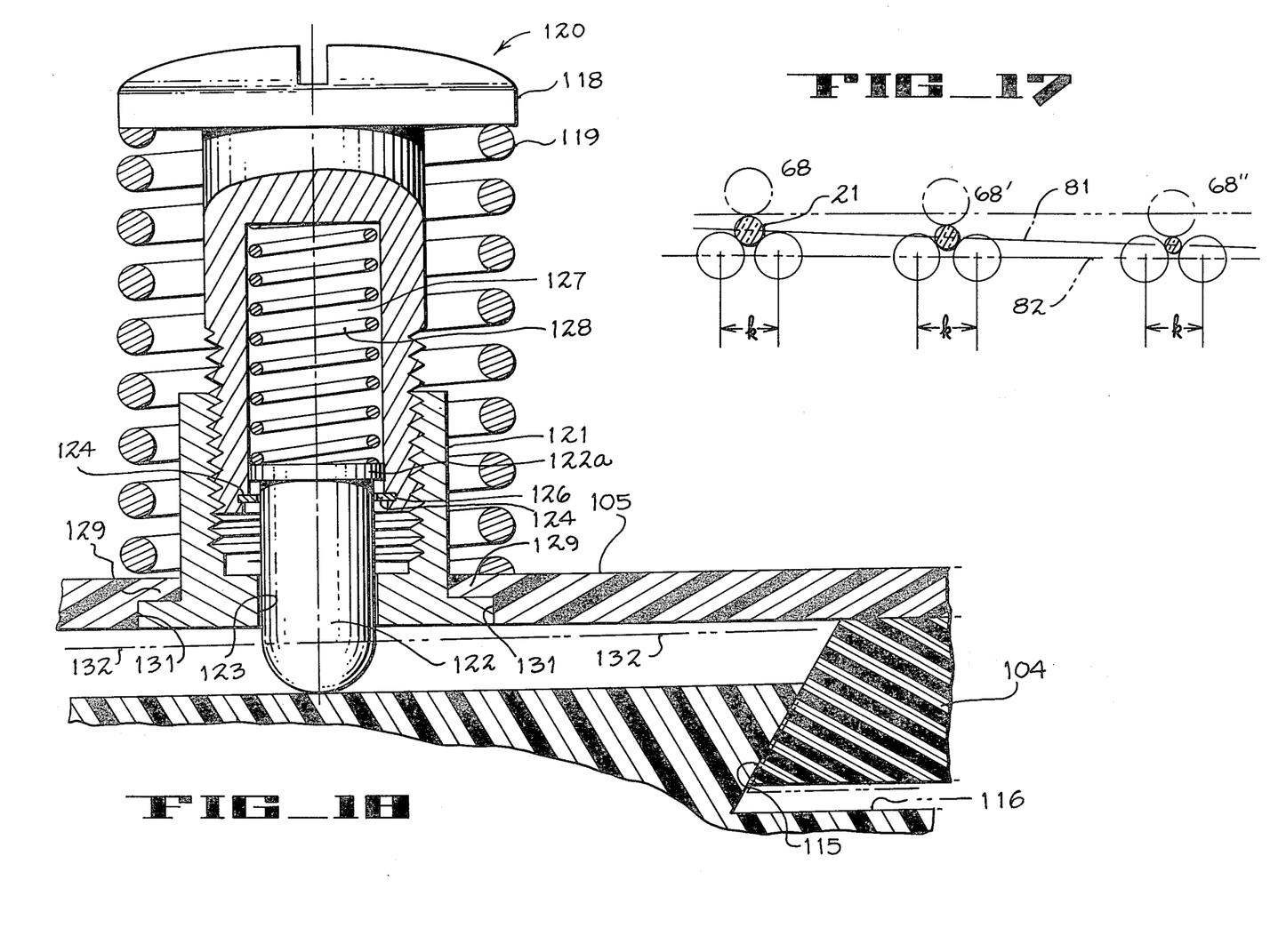
FIG. 17 shows a diagram for purposes of illustration.
FIG. 18 shows an enlarged elevation section view of a biasing assembly according to the invention.

Thus, as shown in FIG. 17 a diagram is shown representative of the problem caused by the rod taper if all assemblies 68 were exactly alike including spacers 79 of equal heights. Rollers 71 can be pivotally moved downwardly to engage any diameter portion of the rod as shown in the figures of FIG. 17. The displacement "k" represents a predetermined spaced relation between the bottom rollers 69.

Accordingly, as shown in FIG. 17 a line 81 taken through the axis of the three fishing rod portions shown lies at an angle to the horizontal, as represented by line 82. Accordingly, in order to dispose the axis of the fishing rod blank in parallel relation to line 82 and in parallel relation to bed member 12, the center assembly 68' is raised slightly by spacer 79' and the right hand assembly 68" must be raised even more by spacer 79".

Even though the height of each spacer block 79 is different, alignment of the axis of the fishing rod blank can still be achieved by moving the assemblies 68 along channel 13 until they engage an appropriate portion of a fishing rod blank to be supported. Thus, it is a combination of the lateral shifting of assemblies 68 combined with the progressively increased height of the assemblies that cooperates to find the axis of rotation of any given fishing rod blank. Heretofore, great difficulty has been experienced in attempting to use vertically adjustable roller supports.

Thus, assemblies 68 are movable along channel 13 until the center of rotation of each assembly lies on the axis of the fishing rod blank when parallel to bed member 12.

As thus arranged, spaced element 77 rides along the top surface of work table 11 and, with a fishing rod blank held by the three rollers of assembly 68, spacer 77 inhibits any tipping or rocking of the assembly 68 toward the operator.

Figure 13:
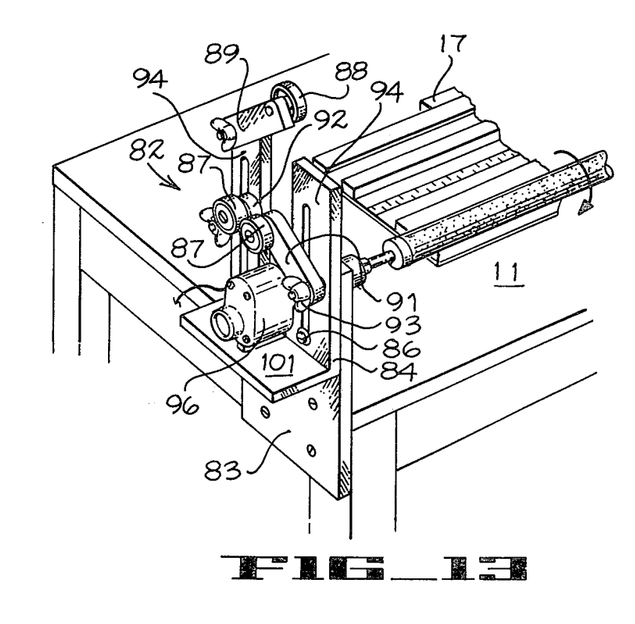
FIG. 13 shows a diagrammatic perspective view of a vertically adjustable rod supporting and holding assembly for supporting a fishing rod blank or the like for rotation as shown in FIG. 14 manually or as coupled to a motor for rotation as shown in FIGS. 11 and 13 as viewed from the direction indicated at numeral 13 in FIG. 11.
Figures 14, 15, 16:
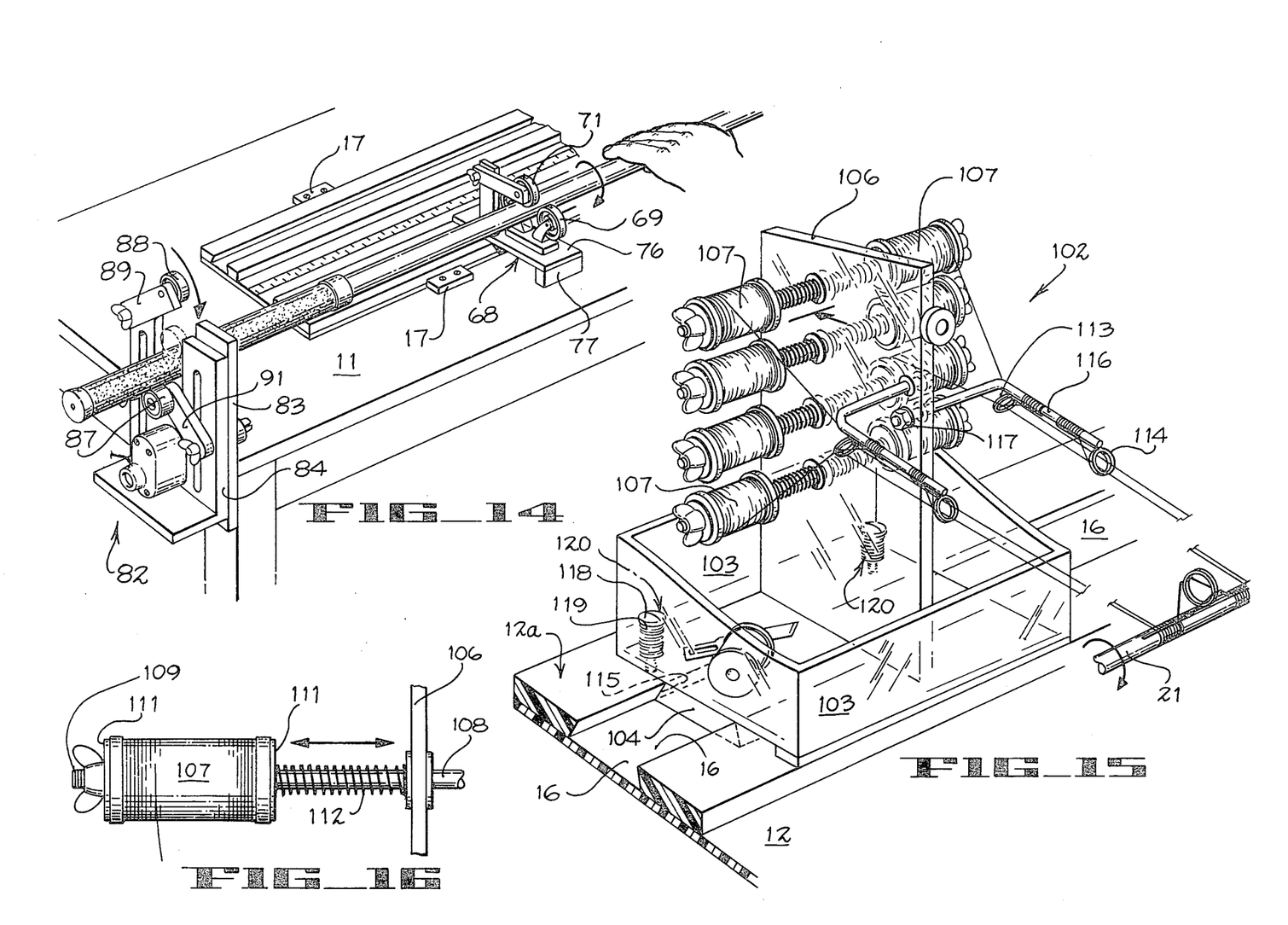
FIG. 14 shows a diagrammatic perspective view of a vertically adjustable rod supporting and rotating assembly as shown in FIG. 13 in conjunction with a fishing rod blank to be rotated thereby.
FIG. 15 shows a diagrammatic perspective view of a multiple thread dispensing and tensioning assembly.
FIG. 16 shows a front elevation view of a single spool of thread and the mounting assembly associated therewith.

As shown in FIG. 14 a vertically adjustable rod supporting and holding assembly 82 is disposed in alignment with assemblies 68. Assembly 82 includes a stationary, upwardly oriented mounting plate 83 secured to an end of work table 11 as shown in FIG. 13. An adjustable carriage 84 moves between raised and lowered positions alongside plate 83 and can be locked in position as desired therealong. Thus, means for readily releasably coupling and decoupling carriage 84 to plate 83, such as the bolt, washer and thumb screw assembly 86 (FIG. 11) permits a relatively easy alignment of the center of rotation of assembly 82.

Assembly 82 includes a plurality of three independently operable rollers arranged to include two bottom rollers 87 disposed in adjustable spaced relation and a top roller 88 carried on a pivot arm 89 to be pivotable into and out of engagement with a fishing rod blank 21 carried between the three rollers to define the center of rotation between the three rollers when so holding the rod.

The bolt, washer and wing nut assembly 86 serves to permit the center of rotation of the three rollers of assembly 82 to be moved upwardly or downwardly into alignment with the axis of the center of rotation of the other supporting and holding assemblies 68.

In assembly 82 pivot arms 91, 92 respectively support each of the two bottom rollers to permit the bottom rollers to be disposed in adjustable spaced relation as desired. Accordingly, a readily tightenable fastening means such as the wing nut 93 serves to engage a bolt extending from each of the two bifurcated upwardly extending arms 94.

As shown best in FIG. 14, when a fishing rod blank is to be rotated manually and where the end of the rod needs to be supported in assembly 82 the rod will rest upon the two bottom rollers 87 and be held in place by pivoting roller 88 downwardly against the rod blank.

In certain circumstances it is has been found desirable to employ a power driven rotating force and in the present instance a motor 96 having a driven axle 97 disposed substantially parallel to a vertical plane including the axis of a fishing rod blank held in the supporting and holding assemblies 68, carries a chuck 98 for engaging a pin 99 temporarily secured to the end of rod 21.

Means such as the ledge 101 extending transversely of carriage 84 serves to support motor 96 to move with carriage 84 between lowered and raised positions so as to align the driven axle 97 with the center of rotation of assemblies 68.

Coupling means such as chuck 98 carried by axle 97 serves to engage pin 99 in an end of the rod supported by assemblies 68 so as to rotate rod 21 on its axis.

As shown best in FIG. 15 a thread dispensing and tensioning assembly 102 comprises a boxlike base portion 103. A dove tailed locking key 104 secured to extend downwardly beneath the bottom of the boxlike base 103 rides in the dovetailed channel 16 in closely spaced relation to the side walls.

A mid-panel 106 supports a thread supply arrangement and comprises a group of eight spools 107 of thread.

As shown in FIG. 16, each spool 107 of thread is mounted similarly from panel 106 by means of an elongate rod or axle 108 formed with threads 109 at each end. Washers 111 disposed at both ends of a spool 107 are urged into engagement against the end faces of each spool 107 by means of a spring 112 carried around rod 108. As thus arranged, during rotation of any given spool a certain amount of resistance is applied to the rotation of the spool and hence tension is introduced into the line drawn therefrom.

It has been observed that where a plurality of threads are simultaneously drawn through a given guide to be wrapped upon a rotatable rod, the threads have a tendency to cross one another and make it difficult to provide an accurate wrapping of the rod. This is especially true where the threads enter the guide from a number of different angles.

As shown in FIG. 15, however, thread guiding means for receiving and dispensing thread simultaneously from a plurality of spools 107 inhibits the plurality of threads being dispensed from crossing each other as now to be described. Thus, the guiding means includes a pair of line guides 113, 114 for one group of spools and a second pair such as 113' and 114' for a second group. Thus, each such pair of line guides is associated with a given bank of spools carried in assembly 102.

Means supporting guides 113, 114 in substantially aligned relation and spaced along a path adapted to simultaneously receive a plurality of threads being dispensed includes the elbow element 116 secured through panel 106 and attached thereto by means of the nut 117. Nut 117 permits elbow 116 to be tipped to direct the axis defined between the two guide elements 113, 114 toward the proper location on the work piece being wrapped.

When withdrawing a group of threads under tension it has been observed to be annoying if the assembly 102 tips toward the operator due to the presence of clearance between key 104 and channel 16. The clearance, however, readily permits assembly to be moved along guide channel 16 as wrapping proceeds from step to step along the rod.

Thus, means are provided to eliminate the tipping problem while permitting assembly 102 to remain easily movable as now to be described.

With respect to assembly 102 means are provided for insuring that as the rod blank 21 commences rotation thread will immediately be drawn from its associated spool 107. Accordingly, means are provided for eliminating lost motion between the dove-tailed locking key 104 and channel 16 while at the same time permitting assembly 102 to be readily movable along channel 16. In short, when a rod blank 21 commences rotation it has been found desirable to preclude any tipping or rocking of assembly 102 about a longitudinal axis parallel to channel 16 before or during delivery of thread to the rod.

Accordingly, the dove-tailed locking key 104 secured to the underside of assembly 102 serves as a guide means for the assembly during its longitudinal motion along channel 16. While key 104 extends extending substantially fully across channel 16 to be guided by the inwardly inclined side walls thereof. Some clearance must be provided between its side walls and the confronting channel walls to permit assembly 102 to be easily shifted. However, it is this clearance that permits assembly 102 to tip toward the operator as threads are drawn from spools 107. Thus, a pair of biasing assemblies 120 serve to lift one side of key 104 to engage the wall of channel 16 to preclude tipping. Accordingly, side wall 115 of key 104 forms an engagement portion disposed to travel closely adjacent one of the sides of the channel whereby biasing means such as assembly 120 carried by assembly 102 serves to yieldingly urge wall 115 upwardly into engagement with the confronting side wall of channel 16 so as to inhibit assembly from rocking about an axis disposed along channel 16.

Accordingly, assemblies 120 serve to yieldingly rotate or lift assembly 102 and key 104 about a longitudinal axis parallel to channel 16 (such as the pivot support rib 125) so as to preclude any tipping of thread dispensing assembly 102 when the thread is drawn therefrom. On the other hand, when it is desired to move the thread dispensing assembly 102 from one location to another along channel 16 the locking effect above described can be readily released merely by pressing down on the back side of the assembly to introduce clearance between key 104 and the side walls of channel 16.

Biasing assembly 120 comprises an internally threaded socket element 121 formed with an exterior flange 129 around the bottom end to be fitted into a stepped opening 131 in the bottom panel 105 and sealed by use of a suitable adhesive. A spring loaded contact pin 122, formed with a flange 122a around its upper end moves via opening 123 between advanced and retracted positions within its cylindrical housing 127 formed axially of an adjustable stud 118. A snap ring 124, when lodged in the detent 126, blocks flange 122a to retain pin 122 within housing 127.

Spring 128, acting on the upper end of pin 122 serves to lift assembly 102 (and the side wall 115 of key 104) into engagement with the side of channel 16. By depressing the back of assembly 102 (as represented by the phantom line 132) the wall surface 115 of key 104 is moved away from the side wall of channel 16.

Spring 119 serves to keep stud 118 from rotating in response to the usual handling of assembly 102 while permitted rotation whenever it is desired to adjust the downward force applied by pin 122.

From the foregoing it will be readily evident that there has been provided an improved system for applying line guides to a fishing rod blank or the like for wrapping the line guides thereon to retain them in place.

As used herein the term fishing rod blank or the like includes a fishing rod having line guides thereon since the system above described is also useful in adding a decorative wrapping to fishing rods which already have their own line guides. Accordingly, the term "fishing rod blank or the like" has been used in order to refer to the fact that a fishing rod with line guides on it may also be considered as a usable workpiece herein.

I claim:

1. In a rod wrapping system of a type having means for supporting a fishing rod blank or the like for rotation on its axis as thread is wrapped therearound, a thread dispensing assembly comprising means for supporting a plurality of spools of thread for rotation about axes substantially parallel to each other and adapted to be disposed substantially parallel to each other and adapted to be disposed substantially parallel to a fishing rod or the like for feeding thread from the spools to be wrapped around the fishing rod blank or the like, and thread guiding means for receiving and dispensing thread simultaneously from a plurality of spools while inhibiting the plurality of threads being dispensed from crossing each other, further including an elongate bed member, a channel formed along said bed member, the sides of said channel being inclined to overlie an edge margin of the bottom of said channel, guide means carried beneath said thread dispensing assembly movable along said channel, the last named means including means extending substantially fully across said channel to be guided by the walls thereof, the last named means having an engagement portion disposed to travel closely adjacent one of the sides of said channel, and means carried by said assembly serving to yieldingly urge said engagement portion upwardly into engagement with a confronting side of said channel to inhibit said assembly from rocking about an axis disposed along said channel.

2. In a rod wrapping system according to claim 1 in which the last named means serves to yieldingly rotate said guide means about a longitudinal axis parallel to said channel.

3. In a rod wrapping system of a type having means for supporting and holding a fishing rod to be rotated on the axis thereof, a vertically adjustable rod supporting and holding assembly disposed at one end of and in alignment with the axis of a fishing rod carried by the first named means, said assembly comprising a stationary, upwardly oriented mounting plate, an adjustable carriage, means for readily releasably coupling and decoupling said carriage to and from said plate to permit movement of said carriage along said plate between lowered and raised positions upon release of the last named means and to secure said carriage to said plate when coupled thereto, said last named assembly including a plurality of three independently operable rollers arranged to include two bottom rollers disposed in spaced relation for receiving a fishing rod mutually thereon and a top roller pivotable into and out of engagement with a fishing rod carried between the three rollers to define the center of rotation between the three rollers when so engaging the rod, said means for readily releasably coupling said carriage to said plate serving to permit the center of rotation of the last named assembly to be moved upwardly or downwardly into alignment with the axis of a fishing rod held by the first named means.

4. In a rod wrapping system according to claim 3, a motor having a driven axle disposed substantially parallel to a vertical plane substantially subdividing the space between said bottom two rollers so as to pass through the axis of a fishing rod when held in the supporting and holding assembly and said first named means, means supporting said motor to move with said carriage between lowered and raised positions to align said axle with the axis of a fishing rod carried by the first named means and coupling means carried by said driven axle and adapted to engage an end of a rod supported by said first named means for rotating the rod on its axis.

5. In a rod wrapping system of a type for applying fishing line guides along a fishing rod blank or the like in axial aligned relation comprising an elongate bed member, an open channel formed in said bed member extending along at least the major portion of the length of said bed member, a plurality of rod supports adapted to be moved variously along said channel, said supports being formed to include a base portion dimensioned to fit snugly within said channel and sufficiently along said channel to provide stability thereto and an upstanding support portion having, as viewed in side elevation, a V-shaped crotch for receiving a rod resting therein, the apex of the V for the support portion of each of said plurality of rod supports lying on a common axis when said supports are disposed in said channel, means carried in said channel for engaging and locking an end of said rod to inhibit rotation thereof during application of line guides thereto the last named means being pivotable about an axis extending transversely of said channel to retain the rod upwardly out of said supports to permit checking the alignment of the line guides disposed onto said rod with said rod disposed unsupported in the region of said guides.

6. In a rod wrapping system according to claim 5 further comprising means movable between lowered and raised positions to engage and prop up the rod to permit the rod to be carried in a cantilevered style for checking alignment of the guides.

7. In a rod wrapping system according to claim 5 in which the last named means comprises means forming a cradle for receiving the handle end of a fishing pole resting thereon, means supporting said cradle for tipping motion about a predetermined axis extending transversely of the axis of the pole, fastening means for readily releasably setting said cradle at a selected angle, means forming a closure across said cradle and movable between raised and lowered positions, and fastening means for readily releasably locking said closure means against the handle of a fishing rod disposed in said cradle to permit said cradle to be tipped to lift the rod upwardly.

8. In a rod wrapping system of a type in which line guides are applied at appropriate intervals along a fishing rod or the like and fastened thereto by wrapping thread about said rod and a portion of the line guide devices, a body having a pre-selected weight disposed at rest on a supporting surface, an elongate flexible cable coupling the weight to the tip end of the rod, means for supporting a fishing rod blank or the like in a bowed orientation for permitting the positions of line guide devices to be marked thereon comprising an elongate flat bed member, an elongate guide means carried by said bed member, holder means retained by said guide means but movable therealong for receiving and holding the handle end of a fishing rod, elevating means retained by said guide and movable therealong, the last named means being movable between lowered and raised positions for engaging and elevating an intermediate portion of said rod while said handle end remains so engaged, the last named means being movable to any of a plurality of heights, and means for retaining said last named means at a selected one of said heights sufficiently elevated above said bed member to cause the tip of said rod to lift the weight clear of the supporting surface therebeneath to bend the rod to form an arc prior to marking off positions on the rod for locating the guides.

9. In a system as in claim 8 further including means of predetermined length extending between said elevating means and said holder means to prevent said holder means and said elevating means from moving apart beyond said predetermined length.

10. In a system as in claim 8 in which said holder means includes an upwardly directed portion facing said elevating means and formed to include a socket for receiving the handle end of a fishing rod.

11. In a rod wrapping system further including rod supporting means including an elongate bed member, elongate guide means carried by said bed member, assemblies for supporting and holding a rod to be wrapped, said assemblies being movable variously along said guide means, each of said assemblies including a plurality of three independently operable rollers arranged to include two bottom rollers disposed in predetermined spaced relation for receiving a fishing rod blank or the like mutually thereon and a top roller pivotable into and out of engagement with a rod carried by said bottom rollers to define the center of rotation between the three rollers when holding the rod, means supporting the center of rotation of each of said assemblies at progressively different heights from said bed member to align the center of rotation of said assemblies to lie substantially on a common axis, said assemblies being movable along said channel until the center of rotation of each given assembly lies on the axis of said rod when parallel to said bed member, a vertically adjustable rod supporting and holding assembly disposed in alignment with said guide means, the last named assembly comprising a stationary, upwardly oriented mounting plate, an adjustable carriage, means for readily releasably coupling said carriage to said plate to permit movement of said carriage along said plate between lowered and raised positions upon release of the last named means and to secure said carriage to said plate when not released, said last named assembly including a plurality of three independently operable rollers arranged to include two bottom rollers disposed in spaced relation and a top roller pivotable into and out of engagement with a fishing rod carried between same to define the center of rotation between the three rollers when so holding the rod, said means for readily releasably coupling said carriage to said plate serving to permit the center of rotation of the last named assembly to be moved upwardly or downwardly into alignment with the axis of the center of rotation of the other supporting and holding assemblies.

12. In a rod wrapping system according to claim 11 comprising pivot arms supporting each of said three rollers of said last named assembly to permit said bottom rollers to be disposed in adjustably spaced relation.

13. In a rod wrapping system according to claim 11 comprising a motor having a driven axle disposed substantially parallel to a vertical plane including the axis of a fishing rod held in the supporting and holding assemblies, and means supporting said motor to move with said carriage between lowered and raised positions to align said axle with the center of rotation of said assemblies, and coupling means carried by said axle and adapted to engage an end of a rod supported by said assemblies for rotating the rod on its axis.

14. In a rod wrapping system comprising rod supporting means comprising an elongate bed member, elongate guide means carried by said bed member, assemblies for supporting and holding a rod to be wrapped, said assemblies being movable variously along said guide means, each of said assemblies including a plurality of three independently operable rollers arranged to include two bottom rollers disposed in predetermined spaced relation for receiving a fishing rod blank or the like mutually thereon and a top roller pivotable into and out of engagement with a rod carried by said bottom rollers to define the center of rotation between the three rollers when holding the rod, means supporting the center of rotation of each of said assemblies at progressively different heights from said bed member to align the center of rotation of said assemblies to lie substantially on a common axis, said assemblies being movable along said channel until the center of rotation of each given assembly lies on the axis of said rod when parallel to said bed member, an elongate table for supporting said bed member, means secured to said table for guiding said bed member to move along the table between first and second positions while therebetween.

* * * * *